United States Patent
Sariel et al.

[11] Patent Number: 5,943,502
[45] Date of Patent: Aug. 24, 1999

[54] APPARATUS AND METHOD FOR FAST 1D DCT

[75] Inventors: Aviram Sariel, Tel Aviv; Rutie Adar, Netanya, both of Israel

[73] Assignee: Neomagic Israel Ltd., Raanaja, Israel

[21] Appl. No.: 09/075,178

[22] Filed: May 11, 1998

Related U.S. Application Data

[63] Continuation-in-part of application No. 08/353,612, Dec. 9, 1994, Pat. No. 5,809,322, and a continuation-in-part of application No. 08/602,871, Feb. 6, 1996, abandoned.

[51] Int. Cl.$^6$ .............................. H04N 7/30; G06F 9/302
[52] U.S. Cl. .............................. 395/800.16; 395/800.18; 395/800.17; 364/725.03
[58] Field of Search ................. 395/500.8, 309, 395/800.17, 800.16, 200.31, 200.32, 800.18, 800.19; 348/465, 458, 467, 397, 423; 364/725.03, DIG. 1, DIG. 2; 712/16, 27, 19, 18, 17, 14

[56] References Cited

U.S. PATENT DOCUMENTS 4,849,922  7/1989  Riolfo ................................ 364/725.03
4,974,078  11/1990  Tsai ..................................... 348/458

*Primary Examiner*—Daniel H. Pan
*Attorney, Agent, or Firm*—Mark M. Friedman

[57] ABSTRACT

A method and apparatus is disclosed for a fast, one-dimensional, discrete cosine transform (1D DCT) of eight samples, and for a fast, one-dimensional, inverse discrete cosine transform (1D IDCT) for eight coefficients, requiring five parallel additions, five parallel subtractions and one parallel multiply operation. According to one embodiment, the parallel additions and subtractions are executed by performing a parallel add/subtract operation. The data are manipulated in a processor operable to execute add, subtract and multiply operations on a plurality of pairs of data values in parallel. According to a preferred embodiment of the invention, this processor is an associative memory array, typically consisting of several thousands of memory words. The inherent scalability of the associative memory enables increasing throughput by simply increasing the size of the associative memory, enabling performing the 1D DCT for large numbers of samples.

14 Claims, 3 Drawing Sheets

Step 8      Step 9      Step 10

$R_0 = N_5$
$R_1 = N_4$
$R_2 = N_7$
$R_3 = N_6$
$R_4 = N_2 + T_0$
$R_5 = T_0 - N_2$
$R_6 = N_0 - N_1$
$R_7 = N_3 - N_1$ $T_0$ is taken from step 2, above.

Step 11      Step 12

$G_0 = R_0$
$G_1 = R_1$
$G_2 = R_2 - R_3$
$G_3 = R_3 + R_2$
$G_4 = R_4 - R_6$
$G_5 = R_5 - R_7$
$G_6 = R_6 + R_4$
$G_7 = R_7 + R_5$

Step 13

The scaled DCT coefficients for input samples $S_0$ - $S_7$.

APPARATUS AND METHOD FOR FAST 1D DCT

This application is a continuation in part of U.S. patent application Ser. No. 08/353,612 filed on Dec. 9, 1994, now U.S. Pat. No. 5,809,322, and Ser. No. 08/602,871 filed on Feb. 6, 1996, abandoned.

FIELD AND BACKGROUND OF THE INVENTION

The present invention relates to image compression, and particularly, the present invention teaches a method for performing a one-dimensional Discrete Cosine Transform (1D DCT), and a one-dimensional Inverse Discrete Cosine Transform (1D IDCT) using parallel processor architectures, such as Single Instruction Multiple Data (SIMD), Multiple Instruction Multiple Data (MIMD), Very Long Instruction Word (VLIW) and associative processor architectures.

Image compression is used in the transmission of digitized images over communication networks to reduce the amount of data in the image while maintaining as high degree of fidelity to the original image. In addition to reducing the amount of data, the goal of sustaining a fast frame rate in the compression and decompression processes has become a major objective for designers and programmers of digital signal processors and other fast processing architectures. Image compression is a central function in digital still cameras, digital camcorders, color printers and scanners and multimedia.

The present invention teaches a fast method for performing a 1D DCT and a 1D IDCT. The teachings of the present invention can be used to accelerate many DCT-based compression algorithms, such as those defined by the Joint Photographic Experts Group (JPEG) for still images, and by the Moving Picture Experts Group for video images (e.g., MPEG-2 and MPEG-4).

The 1D DCT transforms a set of points in the spatial domain to the frequency domain. The 1D DCT is performed on an array of N pixel values, and it yields an array of N frequency coefficients. The following equation shows an eight-point 1D DCT formula suitable for JPEG:

$$S(u) = \frac{C(u)}{2} \sum_{x=0}^{7} s(x)\cos[(2x+1)u\pi/16]$$

Reconstructing the compressed image requires the inverse DCT (IDCT), the formula for which is given below:

$$s(x) = \sum_{u=0}^{7} \frac{C(u)}{2} S(u)\cos[(2x+1)u\pi/16]$$

In both formulae, $C(u)=1/\sqrt{2}$ for u=0; and $C(u)=0$ for u>0. s(x) is the 1D sample value; and S(u) is the 1D DCT coefficient.

In light of the widely recognized need for fast implementations of DCT-based compression and decompression, it would be highly advantageous to have a method for implementing the 1D DCT and 1D IDCT that reduces the number of mathematical operations executed, as this reduces execution time.

Associative processor architecture enables performing logical and mathematical operations between a plurality of vectors in SIMD fashion. The advantages of associative processing will not be recounted here in the interest of brevity. Reference is made to the parent application, U.S. patent application Ser. No. 08/353,612, in which the advantages are discussed. In light of the advantages of associative processing disclosed in the referenced application, and in light of the widely recognized need for fast implementations of DCT-based compression and decompression, it would be highly advantageous to have a method for implementing the 1D DCT and 1D IDCT on an associative processing array and capable of sustaining a fast frame rate. Many additional benefits of the method disclosed will become apparent in the disclosure below.

SUMMARY OF THE INVENTION

According to the present invention there is provided a method of performing a one-dimensional discrete cosine transform (1D DCT) and a one-dimensional inverse discrete cosine transform (1D IDCT) by executing five parallel additions, five parallel subtractions and one parallel multiplication. The 1D DCT of the present invention transforms eight data samples, and the 1D IDCT reconstructs the original image based on the DCT coefficients. The JPEG standard employs a two-dimensional 8×8 DCT that is separable into two, 1D DCT operations on 8 samples.

The 1D DCT method includes the steps of:

I. Inputting all of the data samples for at least one DCT operation (e.g., eight samples for a single DCT operation) to a processor operable to execute parallel addition, parallel subtraction and parallel multiplication. The processor can be a single processor operable to perform all of these operations, or a plurality of units, each unit being operable to perform at least one of these operations. For example, a VLIW processor can feature addition units and multiply units.

II. Executing five parallel additions, five parallel subtractions and one parallel multiplication. These operations are executed on the input samples, the results of these operations and constant values, as described in the disclosure below.

Similarly, the 1D IDCT can be executed by inputting eight DCT coefficients and executing five additions, five subtractions and one multiplication. This is evident when comparing the DCT and IDCT formulae, shown above.

According to further features in preferred embodiments of the invention described below, each parallel addition is executed concurrent to a parallel subtraction. In VLIW architectures this is possible, as various units are capable of executing addition and/or subtraction while operating concurrently. In SIMD architectures, this can be achieved by assigning negative values to the elements to be subtracted and then performing parallel addition. In associative architectures, in addition to the SIMD method described above, another method is possible. In associative architectures, addition and subtraction can be implemented by searching for all entries in the full adder or subtraction truth table, and updating the found entries accordingly. Because at least one of the entries and update values in both, the addition and subtraction truth tables are the same, these common truth tables entries can be implemented on the data at once for both, addition and subtraction.

According to further features in preferred embodiments of the invention, the method is executed using an associative processor array. One of the advantages of this implementation is that it enables implementing a plurality of 1D DCT's or IDCT's in parallel. For example, using an associative array of 8K memory words of 256 bits each enables executing, in parallel, 1,024 1D DCT operations on 8 samples, or the 1D DCT for 128 blocks of 8×8 samples.

The method includes the steps of:

A. Providing an associative processor array featuring a two-dimensional array of associative memory cells. The associative memory cells are operative:

I. to compare the values they store to a broadcast value; and,

II. to write a broadcast value to themselves;

B. Inputting at least eight data samples to the array of memory cells. Typically, each sample is input to a separate associative word, and typically, all samples are stored in uniform logical bit-positions within each word. For example, assuming 8-bit input samples, all of the inputs can be stored in bit-positions 0–7 in each word.

C. Performing five additions, five subtractions and one multiplication between data elements to obtain the 1D DCT result. The data elements are the input samples, the results of these mathematical operations and constant values.

According to further features in preferred embodiments of the invention described below, the arithmetic operations are executed associatively. This involves aligning associated data elements in uniform relation to each other in the array of memory cells. Typically, the pair of related samples is stored in a single associative memory word. For example, the first input samples could all be stored in bit positions 0–7 and each related sample can be stored in bit positions 8–15. Uniform alignment is important because the associative processing array broadcasts values for compare and write operations to particular bit positions in all associative words. Thus, in order to conduct a compare or write operation in parallel for a plurality of samples, it is advantageous to have all bits being compared or written to, located in the same logical bit position within their respective associative words.

With reference to FIG. 1, the bit positions broadcast to, are selected using mask register 1 to mask all other bit positions. The broadcast pattern is loaded to pattern register 5. As indicated by the Figure, these registers span the width of each associative word in the associative memory array, which is 256 bits in FIG. 1. Not accurately represented in FIG. 1 is the depth of the associative array. Typically, the array features several thousands of memory words, such as 8,192 and 16,384.

For considerations of memory management and economy, it is often advantageous to implement arithmetic operators between vectors in the following manner:

1. align only a portion of each associated sample (first portion) with its respective sample;
2. implement the arithmetic operator between theses portions of related samples and their respective samples;
3. proceed to overwrite the first portion of the associated sample with a second portion of the associated sample;
4. implement the arithmetic operator between the second portions of the related samples and their respective samples; and,
5. continuing in this manner until the arithmetic operator has been implemented between the entire first and second vectors.

In this manner, less associative memory is used as each associative word stores a single word and only a portion of an associated sample (instead of the entire portion of two associated of said data elements. The term "portion" relates to a portion of each data element.

Thus, according to further features in preferred embodiments of the invention described below, the arithmetic operators are executed by performing a series of associative compare and write operations.

While addition and subtraction can be implemented using associative methods separately, they may also be implemented in parallel by implementing the truth table for addition and subtraction concurrently for all samples participating in either addition or subtraction. Therefore, according to further features in preferred embodiments of the invention, five operations of concurrent addition and subtraction are performed instead of five additions and five subtractions. See FIG. 2, wherein the algorithm is implemented by performing addition to some elements and subtraction to other elements in the same step.

According to still further features in preferred embodiments of the invention described below, the alignment of associated samples is carried out for a plurality of samples in parallel.

According to still further features in preferred embodiments of the invention described below, the associative processor array features a register array operative to store responders arriving from the associative memory cells and to communicate responder data between associative memory cells. The aligning is carried out by:

1. comparing at least one bit slice in a plurality of samples to a given value and storing the responders generated by a successful match in the register array (this is the associative compare operation);
2. shifting the responders within the register array; and,
3. writing the value of the compare step (step 1) to a bit position assigned to the associated sample in each associative word indicated by the shifted responders.

It has been mentioned above that the DCT transforms a set of eight inputs into eight outputs. According to still further features in preferred embodiments of the invention described below, the 1D DCT of the present invention transforms a plurality of 8×8 blocks of samples in parallel. For instance, considering a two-dimensional DCT (2D DCT) based on 8×8, according to a preferred embodiment the apparatus and method disclosed execute the 1D DCT for a plurality of 8×8 matrices in parallel. Particularly, the JPEG standard calls for a separable 2D DCT using an 8×8 matrix. The associative array of the present invention is capable of inputting 8K samples. Thus, according to a preferred embodiment of the invention, the apparatus and method of the present invention are capable of executing the 1D DCT for 128 8×8 matrices in parallel.

The descriptions given above for the DCT apply to the IDCT as well, as the method disclosed for the DCT is easily adapted to the IDCT by those skilled in the art.

The present invention successfully addresses the shortcomings of the presently known configurations by providing a massively parallel, low cost apparatus and method for executing the 1D DCT on eight samples and the 1D IDCT on eight coefficients employed in many compression and decompression algorithms. Because the apparatus and method of the present invention operate on large blocks of data in parallel, it can execute the 1D DCT and 1D IDCT for a multiplicity of 8×8 blocks in parallel.

Thus, Associative Computing Ltd., the assignee of the present invention, has calculated performance of the DCT and IDCT on its associative processor at under 3,200 machine cycles. Using an associative array of 8,192 memory words of 256 bits each will yield performance of less than one machine cycle per pixel (0.39 cycles, i.e., 3,200/8,192). Furthermore, using an associative array of 16,384 memory words will increase performance to 0.195 machine cycles (3,200/16,384) per pixel.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is for a method of performing the 1D DCT and 1D IDCT algorithms. The algorithm disclosed can be applied to a wide variety of processor architectures, including, but not restricted to, associative arrays. VLIW, SIMD and MIMD architectures. The present disclosure relates particularly to associative arrays, and more particularly, to the associative architecture disclosed in the parent application. However, it will be appreciated that it is within the scope of the present invention to perform or adapt the disclosed method to various processor architectures. In addition, many modifications and variations on the disclosed algorithm are possible as well.

Specifically, the present invention can be used to implement DCT algorithm on a variety of processor architectures to maintain an attractive frame rate.

Regarding the associative processor architecture, reference is made to the parent application, particularly, U.S. patent application Ser. No. 08/353,612.

Figure 1:
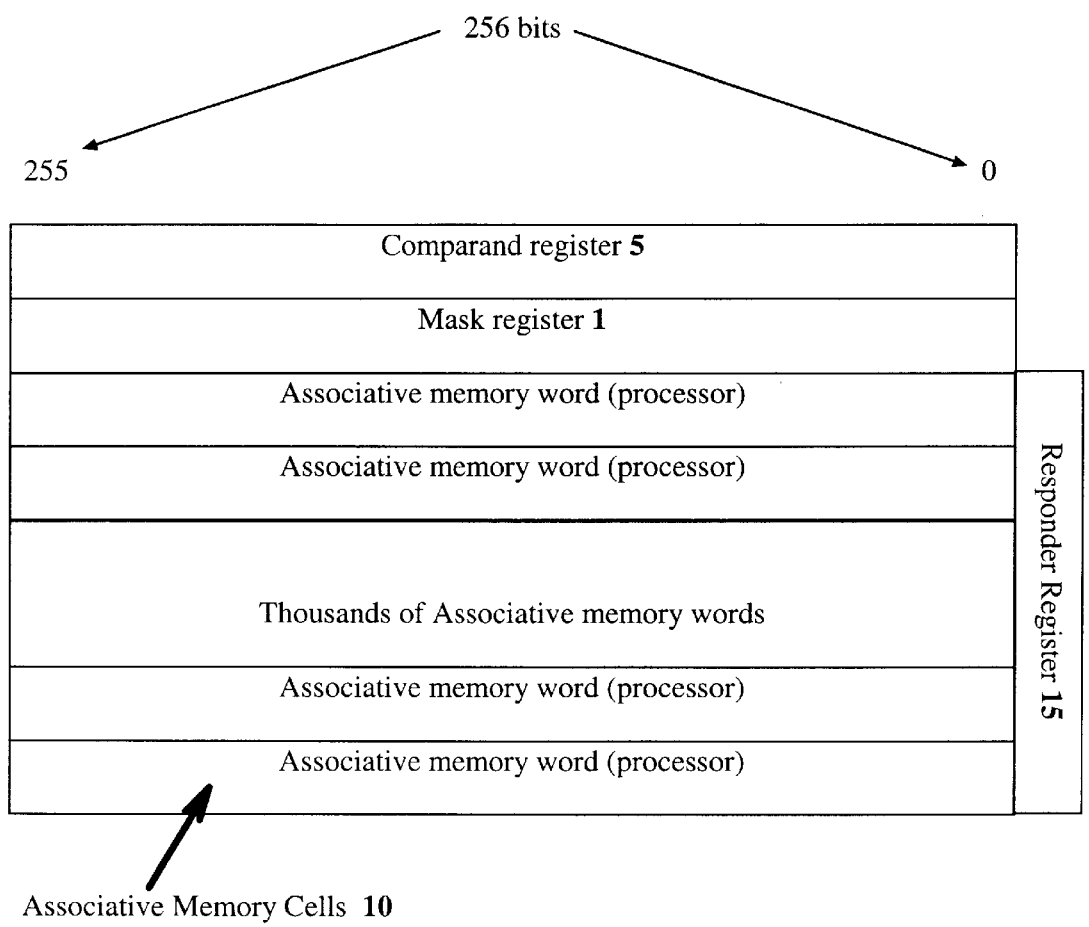
FIG. 1 is a block diagram of the associative processor array.

Referring now to the drawings, FIG. 1 illustrates the associative processor array. This array is formed of a two dimensional array of associative memory cells 10, equipped with the ability to compare their content to a broadcast value and to update their content to a broadcast value. Inter-processor communication is provided via responder register 15 that stores responders arriving from a plurality of processors 10 and shifts the responders within responder register 15 in order to communicate those responders to other processors in the associative processor array.

Thus, FIG. 1 features Mask register 1 and Comparand register 5 whose function it is to broadcast values to array of associative memory cells 10. Mask register 1 selects bit slices in all associative memory words that will be broadcast to and masks all other bits. Comparand register 5 broadcasts the value stored in it to the unmasked bits slices in all associative memory words. FIG. 1 further features responder register 15 to store responders arriving from array 10 and to perform inter-processor communication by shifting those responders.

According to the teachings of the present invention the 1D DCT is implemented in an associative processor by:
(1) arranging a plurality of data elements from an block of N image samples in memory 10;
(2) arranging each element together with an associated element in a single memory word;
(3) executing an arithmetic operator on all pairs of elements in a plurality of associative memory words in parallel; and,
(4) repeating steps 2 and 3 based on the formula disclosed below until the DCT result is obtained.

Figure 2:
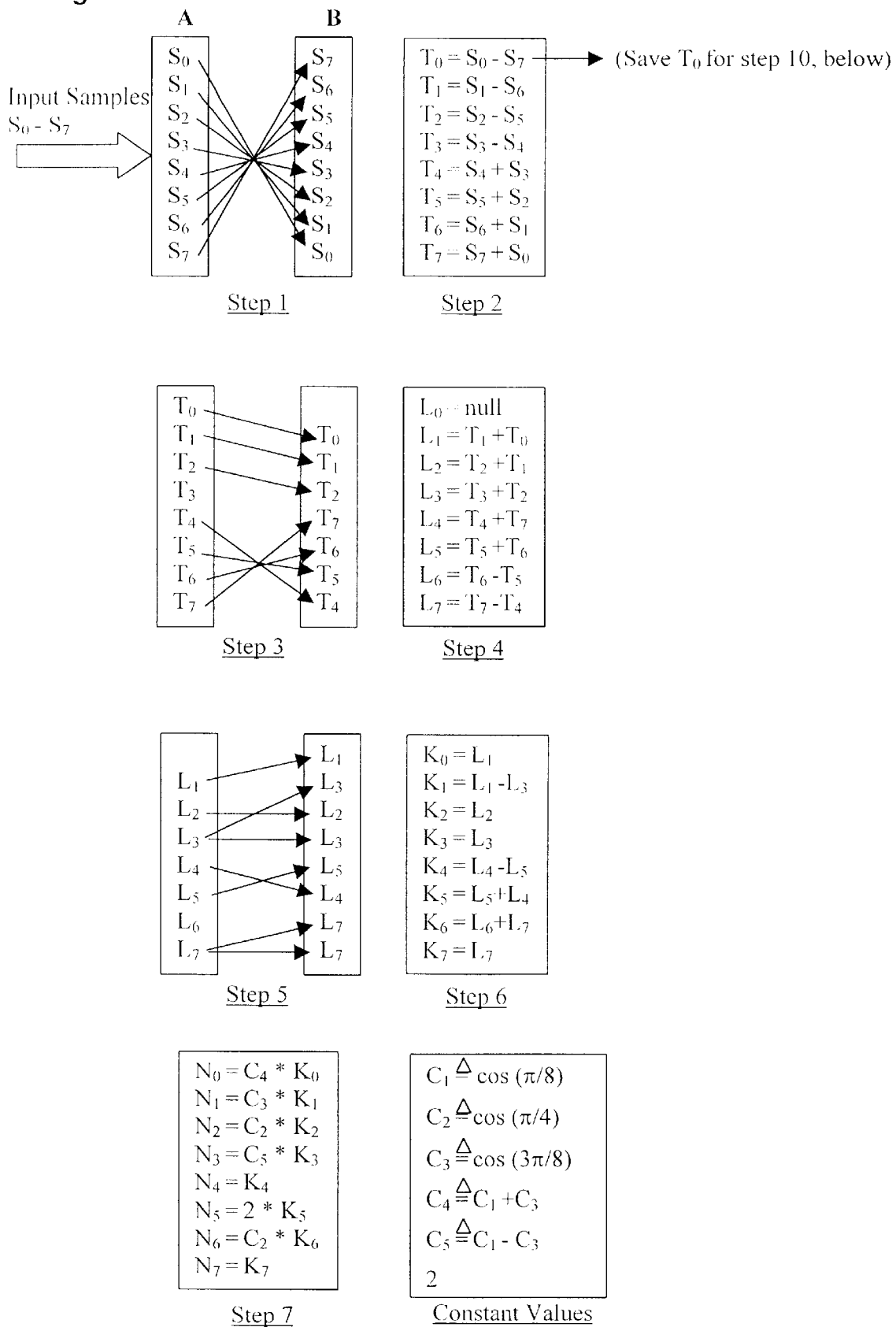
FIG. 2 is a block diagram of the 1D DCT method. It illustrates the data elements stored in the associative memory at every state and how the data are manipulated within the associative memory at each stage.
Figure 2:
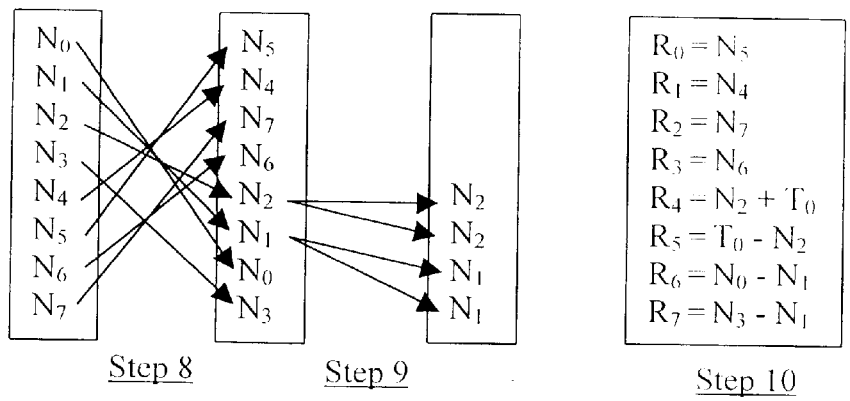
Figure 2:
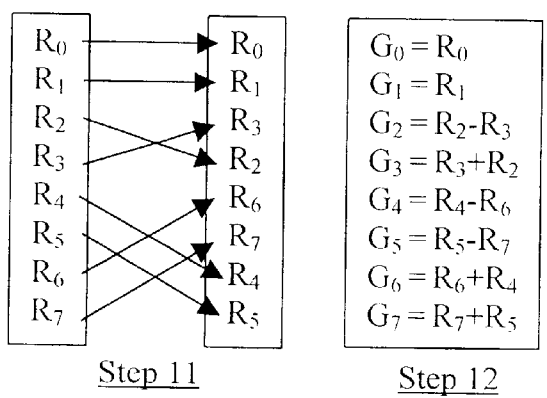
Figure 2:
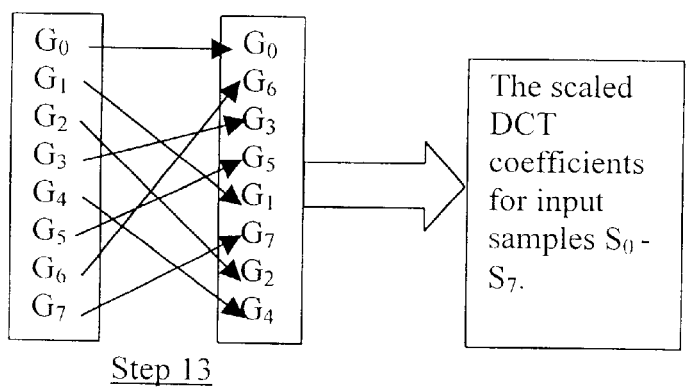

FIG. 2 describes the algorithm in 13 steps. As FIG. 2 demonstrates, the 1D DCT result is obtained by performing five additions, five subtractions and one multiplication.

Step 1—Data $S_0$–$S_7$ are input to the associative memory as a one-dimensional column. While typical associative memories described in the parent application contain several thousand memory words, FIG. 2 illustrates eight input samples, for reasons of visibility and to illustrate the algorithm for a 1D DCT using 8 samples. Associative memories used in actual applications will be capable of executing the disclosed method on several blocks of N pixels in parallel.

Rectangle A in FIG. 2 represents a vector in the associative memory array. A vector is a series of common logical bit positions (such as bits 0–7) in a plurality of associative memory words. For example, bits 0–7 in every associative word form a vector. The number of data elements in a vector depends on the depth of the associative memory array. Typically, this memory array is several thousands of memory words. Thus, typical vectors contain several thousand data elements. With reference to rectangle A, every row represents a distinct vector element.

Each of the eight samples is aligned with an associated sample in preparation for a parallel add/subtract operation on all pairs of samples. The associated samples are shown in rectangle B, that represents a second vector. Corresponding elements in each of vectors A and B (e.g., sample $S_0$ in vector A and sample $S_7$ in vector B) are contained in a single associative memory word. Typically, tags section 15 of the associative processor array, which serves as an intercommunication channel between word processors, serves as a conduit to transfer pixels from one memory word to another.

Step 2—Each pair is either added or subtracted, as the Figure indicates. This step can be carried out in two methods. The first performs addition on one group of elements and subtraction on a second group, whereby the addition and subtraction are two independent operations. The second method implements the addition and subtraction truth tables in parallel. As these operations are typically done by implementing a truth table, the addition and subtraction truth tables have at least one entry in common (e.g., if the value of a given bit position in vector A is 1, the value of a corresponding bit position in vector B is 0 and the carry bit is 1, then the result bit is 0 and the carry bit is 1 for both addition and subtraction). The results of the addition or subtraction, $T_0$–$T_7$, are either written to a new vector or overwrite one of vectors A or B.

Step 3—Results $T_1$–$T_7$ are aligned with associated results $T_0$–$T_2$ and $T_4$–$T_7$ in preparation for step 4. Result $T_0$ is saved for step 10.

Step 4—Results $L_1$–$L_7$ are calculated by implementing addition or subtraction between associated elements, as indicated in the Figure.

Step 5—Results $L_1$–$L_7$ are aligned with associated results $L_1$–$L_7$ in preparation for step 6. In addition, result $L_1$ is entered into the associative memory word that originally contained sample $S_0$.

Step 6—Results $K_0$–$K_7$ are calculated by implementing addition or subtraction between associated L elements, or by assigning results $L_1$–$L_3$ or $L_7$, as indicated in the Figure.

Step 7—Results $K_0$–$K_3$ and $K_6$ are multiplied by look up table values $C_2$–$C_4$, to obtain results $N_0$–$N_7$. ($K_5$ is multiplied by two, which only requires shifting the $K_5$ value one bit position within the associative memory.)

Steps 8–10—Result $N_1$ is aligned with results $N_0$ and $N_3$, and result $T_0$ (from step 2) is aligned with result $N_2$ in two separate associative words to calculate results $R_0$–$R_7$.

Steps 11–12—Results $R_2$–$R_7$ are aligned with associated results $R_2$–$R_7$ and results $G_0$–$G_7$, the 1D DCT results, are calculated.

Step 13—Results $G_0$–$G_7$ are arranged in the associative memory such that each result is located in the same associative word that its respective input was located in. Thus, $G_0$ is the 1D DCT result for input sample $S_0$, and $G_6$ is the 1D DCT result for input $S_1$.

The method described in FIG. 2 can be implemented using a wide range of parallel processing architectures to perform the additions, subtractions and multiplications between associated data elements in parallel as shown in FIG. 2 and described above.

Proof that the present method implements the 1D DCT is given in Appendix A.

While the invention has been described with respect to a limited number of embodiments, it will be appreciated that many variations, modifications and other applications of the invention may be made.

Appendix A

DCT PROOF 1. 1D 8 samples DCT Definition:

$$S(u) \equiv \frac{C(u)}{2} \cdot \sum_{x=0}^{7} s(x) \cdot \cos\left(u \cdot \pi \cdot \frac{2 \cdot x + 1}{16}\right)$$

Where:

S(u)–1D DCT coefficient

S(x)–1D sample value $$C(u) = \begin{cases} 1/\sqrt{2}\,; & u = 0 \\ 1; & \text{else} \end{cases}$$

2. Scaled 1D 8 samples DCT Definition:

$$F(u) \equiv D(u) \cdot S(u)$$

Where:

$$D(u) \equiv \frac{4}{C(u) \cdot \cos\left(\frac{u \cdot \pi}{16}\right)}$$

S(u) and C(u) as defined above

3. Equivalence condition:

Note that the algorithm defines F(u) as a sum:

$$F(u) = \sum_{x=0}^{7} f(u, x) \cdot s(x)$$

so the following condition is derived:

$$2 \cdot \cos\left(\frac{u \cdot \pi}{16}\right) \cdot \cos\left(u \cdot \pi \cdot \frac{2 \cdot x + 1}{16}\right) = f(u, x)$$

Translating the left hand side of the condition to numeric values, one gets the following table, given here in MATLAB format:

| Columns 1 through 4 | | | |
|---|---|---|---|
| 2.00000000000000 | 1.92387953251129 | 1.70710678118655 | 1.38268343236509 |
| 2.00000000000000 | 1.63098631369783 | 0.70710678118655 | −0.32442334882146 |
| 2.00000000000000 | 1.08979021355164 | −0.70710678118655 | −1.63098631369783 |
| 2.00000000000000 | 0.38268343236509 | −1.70710678118655 | −0.92387953251129 |
| 2.00000000000000 | −0.38268343236509 | −1.70710678118655 | 0.92387953251129 |
| 2.00000000000000 | −1.08979021355164 | −0.70710678118655 | 1.63098631369783 |
| 2.00000000000000 | −1.63098631369783 | 0.70710678118655 | 0.32442334882146 |
| 2.00000000000000 | −1.92387953251129 | 1.70710678118655 | −1.38268343236509 |
| Columns 5 through 8 | | | |
| 1.00000000000000 | 0.61731656763491 | 0.29289321881345 | 0.07612046748871 |
| −1.00000000000000 | −1.08979021355164 | −0.70710678118655 | −0.21677275132474 |
| −1.00000000000000 | 0.21677275132474 | 0.70710678118655 | 0.32442334882146 |
| 1.00000000000000 | 0.92387953251129 | −0.29289321881345 | −0.38268343236509 |
| 1.00000000000000 | −0.92387953251129 | −0.29289321881345 | 0.38268343236509 |
| −1.00000000000000 | −0.21677275132474 | 0.70710678118655 | −0.32442334882146 |
| −1.00000000000000 | 1.08979021355164 | −0.70710678118655 | 0.21677275132474 |
| 1.00000000000000 | −0.61731656763491 | 0.29289321881345 | −0.07612046748871 |

The columns represent u values (first column—u=0, second—u=1, and so on), while the rows stand for x values (first row—x=0, second row —x=1 . . . ).

We shall now show that the algorithm described above delivers an identical [f(u,x)] matrix on the right hand side of the equivalence condition.

Note that exact proof can be achieved via proving the 64 trigonometric identities defined by the equivalence condition, which is not hard—only exhausting.

$f(0, x)$:

$$F_0 = G_0 = R_0 = N_5 = 2 \cdot K_5 = 2 \cdot (L_4 + L_5) = 2 \cdot (T_4 + T_5 + T_6 + T_7)$$
$$= 2 \cdot (S_0 + S_1 + S_2 + S_3 + S_4 + S_5 + S_6 + S_7)$$

$$\overline{f}(0, x) = \begin{Bmatrix} 2 \\ 2 \\ 2 \\ 2 \\ 2 \\ 2 \\ 2 \\ 2 \end{Bmatrix}$$

$f(1, x)$:

$$F_1 = G_6 = R_6 + R_4 = T_0 + N_2 + N_0 - N_1 = T_0 + C_2 \cdot K_2 + C_4 \cdot K_0 - C_3 \cdot K_1$$
$$= T_0 + C_2 \cdot L_2 + C_4 \cdot L_1 - C_3 \cdot (L_1 - L_3)$$
$$= S_0 - S_7 + C_2 \cdot (S_2 - S_5 + S_1 - S_6) + C_4 \cdot (S_1 - S_6 + S_0 - S_7) -$$
$$C_3 \cdot (S_1 - S_6 + S_0 - S_7 - S_2 + S_5 - S_3 + S_4)$$

$$\overline{f}(1, x) = \begin{Bmatrix} 1 + C_4 - C_3 \\ C_2 + C_4 - C_3 \\ C_2 + C_3 \\ C_3 \\ -C_3 \\ -C_2 - C_3 \\ C_3 - C_2 - C_4 \\ C_3 - C_4 - 1 \end{Bmatrix} = \begin{Bmatrix} 1 + \cos\left(\frac{\pi}{8}\right) \\ \cos\left(\frac{\pi}{4}\right) + \cos\left(\frac{\pi}{8}\right) \\ \cos\left(\frac{\pi}{4}\right) + \cos\left(\frac{3 \cdot \pi}{8}\right) \\ \cos\left(\frac{3 \cdot \pi}{8}\right) \\ -\cos\left(\frac{3 \cdot \pi}{8}\right) \\ -\cos\left(\frac{\pi}{4}\right) - \cos\left(\frac{3 \cdot \pi}{8}\right) \\ -\cos\left(\frac{\pi}{4}\right) - \cos\left(\frac{\pi}{8}\right) \\ -1 - \cos\left(\frac{\pi}{8}\right) \end{Bmatrix} = \begin{Bmatrix} 1.923880 \\ 1.630986 \\ 1.089790 \\ 0.382683 \\ -0.382683 \\ -1.089790 \\ -1.630986 \\ -1.923880 \end{Bmatrix}$$

$f(2, x)$:

$$F_2 = G_3 = R_3 + R_2 = N_6 + N_7 = K_7 + C_2 2 \cdot K_6 = L_7 + C_2 \cdot (L_6 + L_7) = T_7 - T_4 + C_2 \cdot [(T_6 - T_5) + (T_7 - T_4)]$$
$$= S_0 + S_7 - S_3 - S_4 + C_2 \cdot (S_1 + S_6 - S_2 - S_5 + S_0 + S_7 - S_3 - S_4)$$

$$\overline{f}(2, x) = \begin{Bmatrix} 1 + C_2 \\ C_2 \\ -C_2 \\ -1 - C_2 \\ -1 - C_2 \\ -C_2 \\ C_2 \\ 1 + C_2 \end{Bmatrix} = \begin{Bmatrix} 1 + \cos\left(\frac{\pi}{4}\right) \\ \cos\left(\frac{\pi}{4}\right) \\ -\cos\left(\frac{\pi}{4}\right) \\ -1 - \cos\left(\frac{\pi}{4}\right) \\ -1 - \cos\left(\frac{\pi}{4}\right) \\ -\cos\left(\frac{\pi}{4}\right) \\ \cos\left(\frac{\pi}{4}\right) \\ 1 + \cos\left(\frac{\pi}{4}\right) \end{Bmatrix} = \begin{Bmatrix} 1.707107 \\ 0.707107 \\ -0.707107 \\ -1.707107 \\ -1.707107 \\ -0.707107 \\ 0.707107 \\ 1.707107 \end{Bmatrix}$$

$f(3, x)$:

$$F_3 = G_5 = R_5 - R_7 = T_0 - N_0 - N_3 + N_1 = T_0 - C_2 \cdot K_2 - C_5 \cdot K_3 + C_3 \cdot K_1 = T_0 - C_2 \cdot L_2 - C_5 \cdot L_3 + C_3 \cdot (L_1 - L_3)$$

-continued $$= T_0 - C_2 \cdot (T_2 + T_1) - C_5 \cdot (T_2 + T_3) + C_3 \cdot [(T_1 + T_0) - (T_2 + T_3)]$$

$$= S_0 - S_7 - C_2 \cdot (S_2 - S_5 + S_1 - S_6) - C_5 \cdot (S_2 - S_5 + S_3 - S_4) + C_3 \cdot (S_1 - S_6 + S_0 - S_7 - S_2 + S_5 - S_3 + S_4)$$

$$\overline{f}(3, x) = \begin{Bmatrix} 1 + C_3 \\ C_3 - C_2 \\ -C_2 - C_3 - C_5 \\ -C_5 - C_3 \\ C_5 + C_3 \\ C_2 + C_5 + C_3 \\ C_2 - C_3 \\ -1 - C_3 \end{Bmatrix} = \begin{Bmatrix} 1 + \cos\left(\dfrac{3\cdot\pi}{8}\right) \\ -\cos\left(\dfrac{\pi}{4}\right) + \cos\left(\dfrac{3\cdot\pi}{8}\right) \\ -\cos\left(\dfrac{\pi}{4}\right) - \cos\left(\dfrac{\pi}{8}\right) \\ -\cos\left(\dfrac{\pi}{8}\right) \\ \cos\left(\dfrac{\pi}{8}\right) \\ \cos\left(\dfrac{\pi}{4}\right) + \cos\left(\dfrac{\pi}{8}\right) \\ \cos\left(\dfrac{\pi}{4}\right) - \cos\left(\dfrac{3\cdot\pi}{8}\right) \\ -1 - \cos\left(\dfrac{3\cdot\pi}{8}\right) \end{Bmatrix} = \begin{Bmatrix} 1.382683 \\ -0.324423 \\ -1.630986 \\ -0.923880 \\ 0.923880 \\ 1.630986 \\ 0.324423 \\ -1.382683 \end{Bmatrix}$$

$f(4, x)$:

$$F_4 = G_1 = R_1 = N_4 = K_4 = L_4 - L_5 = T_7 + T_4 - T_5 - T_6 = S_0 + S_7 + S_3 + S_4 - S_2 - S_5 - S_1 - S_6$$

$$f(u, x) = \begin{Bmatrix} 1 \\ -1 \\ -1 \\ 1 \\ 1 \\ -1 \\ -1 \\ 1 \end{Bmatrix}$$

$f(5, x)$:

$$F_5 = G_7 = R_5 + R_7 = T_0 - N_2 + N_3 - N_1 = T_0 - C_2 \cdot K_2 + C_5 \cdot K_3 - C_3 \cdot K_1 = T_0 - C_2 \cdot L_2 + C_5 \cdot L_3 - C_3 \cdot (L_1 - L_3)$$

$$= T_0 - C_2 \cdot (T_2 + T_1) + C_5 \cdot (T_2 + T_3) - C_3 \cdot [(T_1 + T_0) - (T_2 + T_3)]$$

$$= S_0 - S_7 - C_2 \cdot (S_2 - S_5 + S_1 - S_6) + C_5 \cdot (S_2 - S_5 + S_3 - S_4)$$

$$- C_3 \cdot (S_1 - S_6 + S_0 - S_7 - S_2 + S_5 - S_3 + S_4)$$

$$\overline{f}(u, x) = \begin{Bmatrix} 1 - C3 \\ -C2 - C3 \\ -C2 + C5 + C3 \\ C5 + C3 \\ -C5 - C3 \\ C2 - C5 - C3 \\ C2 + C3 \\ -1 + C3 \end{Bmatrix} = \begin{Bmatrix} 1 - \cos\left(\dfrac{3\cdot\pi}{8}\right) \\ -\cos\left(\dfrac{\pi}{4}\right) - \cos\left(\dfrac{3\cdot\pi}{8}\right) \\ -\cos\left(\dfrac{\pi}{4}\right) + \cos\left(\dfrac{3\cdot\pi}{8}\right) \\ \cos\left(\dfrac{\pi}{8}\right) \\ -\cos\left(\dfrac{\pi}{8}\right) \\ \cos\left(\dfrac{\pi}{4}\right) - \cos\left(\dfrac{\pi}{8}\right) \\ \cos\left(\dfrac{\pi}{4}\right) + \cos\left(\dfrac{3\cdot\pi}{8}\right) \\ -1 + \cos\left(\dfrac{3\cdot\pi}{8}\right) \end{Bmatrix} = \begin{Bmatrix} 0.617317 \\ -1.089790 \\ 0.216773 \\ 0.923880 \\ -0.923880 \\ -0.216773 \\ 1.089790 \\ -0.617317 \end{Bmatrix}$$

$f(6, x)$:

$$F_6 = G_2 = R_2 - R_3 = N_7 - N_6 = K_7 - C_2 \cdot K_6 = L_7 - C_2 \cdot (L_6 + L_7) = T_7 - T_4 - C_2 \cdot [(T_6 - T_5) + (T_7 - T_4)]$$

$$= S_0 + S_7 - S_3 - S_4 - C_2 \cdot (S_1 + S_6 - S_2 - S_5 + S_0 + S_7 - S_3 - S_4)$$

$$\overline{f}(u,x) = \begin{Bmatrix} 1 - C_2 \\ -C_2 \\ C_2 \\ -1 + C_2 \\ -1 + C_2 \\ C_2 \\ -C_2 \\ 1 - C_2 \end{Bmatrix} = \begin{Bmatrix} 1 - \cos\left(\frac{\pi}{4}\right) \\ -\cos\left(\frac{\pi}{4}\right) \\ \cos\left(\frac{\pi}{4}\right) \\ -1 + \cos\left(\frac{\pi}{4}\right) \\ -1 + \cos\left(\frac{\pi}{4}\right) \\ \cos\left(\frac{\pi}{4}\right) \\ -\cos\left(\frac{\pi}{4}\right) \\ 1 - \cos\left(\frac{\pi}{4}\right) \end{Bmatrix} = \begin{Bmatrix} 0.292893 \\ -0.707107 \\ 0.707107 \\ -0.292893 \\ -0.292893 \\ 0.707107 \\ -0.707107 \\ 0.292893 \end{Bmatrix}$$

$f(7, x)$:

$$F_7 = G_4 = R_4 - R_6 = T_0 + N_2 - N_0 + N_1 = T_0 + C_2 \cdot K_2 - C_4 \cdot K_0 + C_3 \cdot K_1$$

$$= T_0 + C_2 \cdot L_2 - C_4 \cdot L_1 + C_3 \cdot (L_1 - L_3) = T_0 + C_2 \cdot (T_2 + T_1) - C_4 \cdot (T_1 + T_0) + C_3 \cdot [(T_1 + T_0) - (T_2 + T_3)]$$

$$\overline{f}(7,x) = \begin{Bmatrix} 1 - C_4 - C_3 \\ C_2 - C_4 + C_3 \\ C_2 - C_3 \\ -C_3 \\ C_3 \\ C_3 - C_2 \\ C_4 - C_2 - C_3 \\ -1 + C_4 - C_3 \end{Bmatrix} = \begin{Bmatrix} 1 - \cos\left(\frac{\pi}{8}\right) \\ \cos\left(\frac{\pi}{4}\right) - \cos\left(\frac{\pi}{8}\right) \\ \cos\left(\frac{\pi}{4}\right) - \cos\left(\frac{3 \cdot \pi}{8}\right) \\ -\cos\left(\frac{3 \cdot \pi}{8}\right) \\ \cos\left(\frac{3 \cdot \pi}{8}\right) \\ -\cos\left(\frac{\pi}{4}\right) + \cos\left(\frac{3 \cdot \pi}{8}\right) \\ -\cos\left(\frac{\pi}{4}\right) + \cos\left(\frac{\pi}{8}\right) \\ -1 + \cos\left(\frac{\pi}{8}\right) \end{Bmatrix} = \begin{Bmatrix} 0.076120 \\ -0.216773 \\ 0.324423 \\ -0.382683 \\ 0.382683 \\ -0.324423 \\ 0.216773 \\ -0.076120 \end{Bmatrix}$$

It can be readily seen that the matrix [f(u,x)], i.e—[f(0,x) f(1,x) f((2,x) f(3,x) f(4,x) f(5,x) f(6,x) f(7,x)] matches accurately the equivalence condition matrix given above.

What is claimed is:

1. A method of performing a one-dimensional discrete cosine transform (1D DCT) on eight samples, the method comprising:
   A. providing an associative processor array featuring a plurality of memory words made up of associative memory cells, said cells being operative to compare values stored therein to a value broadcast to a plurality of said memory words and to write thereto a value broadcast to a plurality of said memory words, operable to implement at least one arithmetic operation in parallel on a plurality of pairs of input values;
   B. inputting at least eight data samples to said associative processor array; and
   C. executing five additions, five subtractions and one multiplication, each of said arithmetic operations being executed in parallel on a plurality of pairs of data elements, said data elements being said input data samples, results of said arithmetic operations and constant values.

2. The method of claim 1, wherein at least one of said additions is executed concurrent to at least one of said subtractions.

3. The method of claim 1, wherein said arithmetic operations are executed by:
   I. arranging, in a plurality of said memory words, at least a portion of two associated of said data elements within a single of said memory words;
   II. broadcasting a value to a plurality of said memory words and locating instances of said value; and,
   III. writing a broadcast result value, in parallel, to said memory words based on said located instances.

4. The method of claim 3, wherein at least one of said additions and subtractions is executed by performing an associative add/sub operations.

5. The method of claim 4, wherein said associative processor array features a register array operative to store responders arriving from said memory cells and to communicate said responders to said memory cells, and wherein said arranging is carried out by said register array receiving said responders from a first plurality of said memory cells, shifting said responders in said register array and communicating said responders to a second plurality of said memory cells.

6. The method of claim 1, wherein said input data samples include a plurality of 8×8 blocks of samples, the method performing the 1D DCT for said plurality of 8×8 blocks of samples in parallel.

7. The method of claim 1, wherein said associative processor array calculates the DCT in less than two machine cycles per each of said input data samples.

8. A method of performing a one-dimensional inverse discrete cosine transform (1D IDCT) of eight coefficients, the method comprising:

A. providing an associative processor array featuring a plurality of memory words made up of associative memory cells, said cells being operative to compare values stored therein to a value broadcast to a plurality of said memory words and to write thereto a value broadcast to a plurality of said memory words, operable to implement at least one arithmetic operation in parallel on a plurality of pairs of input values;

B. inputting at least eight DCT coefficients to said associative processor array; and C. executing five additions, five subtractions and one multiplication, each of said arithmetic operations being executed in parallel on a plurality of pairs of data elements, said data elements being said input DCT coefficients, results of said arithmetic operations and constant values.

9. The method of claim 8, wherein at least one of said additions is executed concurrent to at least one of said subtractions.

10. The method of claim 8, wherein said arithmetic operations are executed by:

(I) arranging, in a plurality of said memory words, at least a portion of two associated of said data elements within a single of said memory words;

(II) broadcasting a value to a plurality of said memory words and locating instances of said value; and, (III) writing a broadcast result value, in parallel, to said memory words based on said located instances.

11. The method of claim 10, wherein at least one of said additions and subtractions is executed by performing an associative add/sub operation.

12. The method of claim 10, wherein said associative processor array features a register array operative to store responders arriving from said memory cells and to communicate said responders to said memory cells, and wherein said arranging is carried out by said register array receiving said responders from a first plurality of said memory cells, shifting said responders in said register array and communicating said responders to a second plurality of said memory cells.

13. The method of claim 8, wherein said input includes a plurality of 8×8 blocks of DCT coefficients, the method performing the 1D IDCT for said plurality of 8×8 DCT coefficients in parallel.

14. The method of claim 8, wherein said associative processor array performs the IDCT in less than two machine cycles per each of said input DCT coefficients.

* * * * *